April 13, 1948.   C. A. WEST   2,439,706
TEMPERATURE CONTROLLED ACTUATING MECHANISM
Filed Feb. 23, 1946
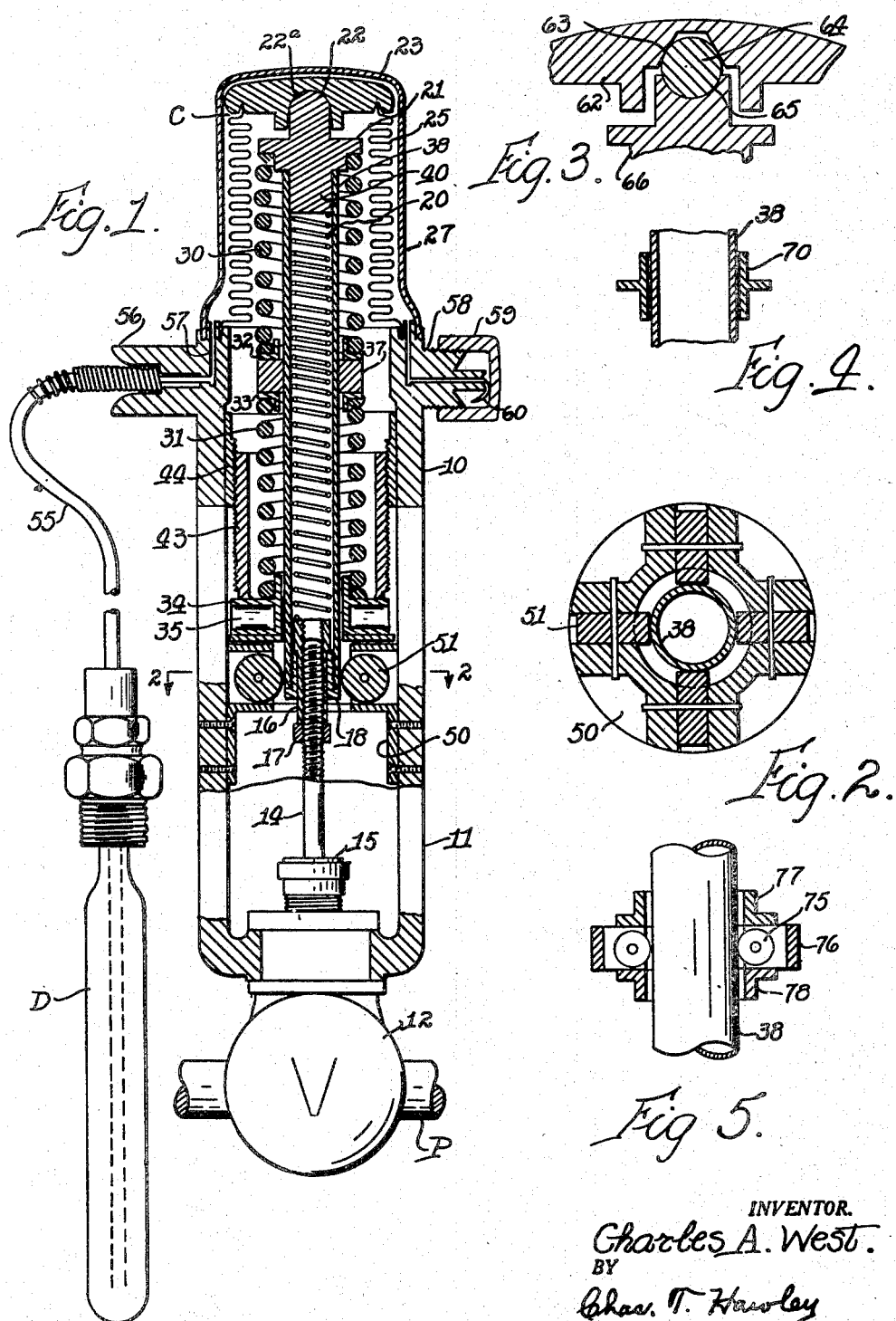
INVENTOR.
Charles A. West.
BY
Chas. T. Hawley
ATTY.

Patented Apr. 13, 1948

2,439,706

UNITED STATES PATENT OFFICE 2,439,706

TEMPERATURE CONTROLLED ACTUATING MECHANISM

Charles A. West, Southbridge, Mass.

Application February 23, 1946, Serial No. 649,643

3 Claims. (Cl. 236—99)

This invention relates to mechanism adapted to perform a mechanical operation, such as opening or closing a valve, under the automatic control of a temperature-responsive device.

It is the general object of my invention to improve the construction of such mechanism as heretofore known, in such manner as to effect substantial reduction in size, weight and cost, while at the same time providing more rapid response and more satisfactory operation.

My invention further relates to arrangements and combinations of parts which will be hereinafter described and more particularly pointed out in the appended claims.

A preferred form of the invention is shown in the drawings, in which

Fig. 1 is a sectional side elevation of my improved actuating mechanism;

Fig. 2 is a sectional plan view of certain parts, taken along the general line 2—2 in Fig. 1; and Figs. 3, 4 and 5, are sectional views showing modified detail constructions to be described.

Referring to the drawings, my improved actuating mechanism comprises a casing 10 having a depending open frame portion 11 adapted to be mounted on a valve 12 of any suitable construction, provided only that the valve may be opened and closed by axial movement of a valve rod 14 slidable in a gland 15.

The valve rod 14 is mounted in a rotatable threaded sleeve or tubular nut 16 and may be secured in axially adjusted position by a lock nut 17. The sleeve 16 is slidable in a collar 18, and a shoulder on the sleeve 16 is normally held against the collar 18 by a coil spring 20 which at its upper end engages a thrust member 21.

The sleeve 16 and spring 20 provide a safety release for the valve 12 if the temperature continues to rise and the pressure continues to increase after the valve 12 is fully closed. In this event, the collar 18 is pushed downward along the sleeve 16 and no damage is done to the valve-actuating mechanism.

The thrust member 21 has an upward projection 22 having a rounded end seated in a semispherical depression in a cap 23. The cap 23 is connected by a tubular bellows member 25 to the upper face of the casing 10. The edges of the bellows member 25 may be firmly secured in the cap 23 and to the casing 10 by soldering the edges in grooves or recesses in said parts or in any other suitable manner.

A cover 27 surrounds the bellows member 25 and cap 23 in spaced relation and is similarly permanently secured to the upper portion of the casing 10. An annular pressure chamber C is thus provided between the inner face of the cover 27 and the outer face of the bellows member 25, together with the top surface of the cap 23.

The cap 23 is of slightly larger diameter than the bellows member 25 to avoid wear on the latter. The cover 27 in effect constitutes the upper part of the casing 10 and is to be considered a part of the casing in the interpretations of the claims.

The valve rod 14 is normally held upward to open the valve 12 by a pair of heavy tandem coil springs 30 and 31. The upper spring 30 is centered at its upper end by a shouldered downward projection of the thrust member 21 and at its lower end is seated on a flanged collar 32. The upper end of the lower spring 31 is similarly seated in a flanged collar 33, and the lower end thereof is seated in a flanged collar 34 having radial openings 35 by which it may be turned.

The flanged collars 32 and 33 oppositely engage a ring 37 which is loosely slidable on a tube 38. The ring 37 may be of bronze, plastic or any other suitable and preferably self-lubricating material.

The tube 38 is secured at its upper end to a further downward projection 40 of the member 21 and at its lower end is secured to the collar 18 previously described. The flanged collar 34 has a sleeve-like upward outer extension 43 which is threaded to an internal portion 44 of the casing 10.

A member 50 is secured in the downwardly extending open frame portion 11 of the casing 10, and antifriction rolls 51 (Fig. 2) are pivotally mounted in the member 50, with slight clearance of the tube 38. The tube 38 is thus vertically centered and guided by said rolls.

A fluid-filled device D which is responsive to temperature changes is connected by a tube 55 and coupling 56 to a passage 57 which communicates with the chamber C between the cover 27 and the bellows member 25.

A filler extension 58 of the casing 10 may be provided, which extension is normally enclosed by a cap 59 after the filler tube 60 has been sealed.

The device D is to be placed wherever the temperature is to be controlled and is partially filled with a temperature-responsive liquid. The tube 55 extends nearly to the closed end of the device D, so that on rise in temperature and expansion of the fluid in the device, a portion of the liquid will be forced upward through the tube 55 to the chamber C and will thus depress the cap 23, the thrust member 21, the tube 38 and the valve stem 14. This closes the valve V to the extent indicated by the rise in temperature.

Lateral displacement or buckling of the springs 30 and 31 on compression is substantially prevented by providing two relatively short springs instead of a single long spring, and by providing the sliding ring 37 and the flanged collars 32 and 33 all centered on the tube 38. The lower end of the tube 38 being closely guided by the rolls 51, straight-line motion of the valve rod 14 is assured and sidewise pressure on the gland 15 is substantially avoided.

The device is adapted for different operating temperatures by selecting a liquid for the device D which has the desired temperature range. The pressure to which the mechanism responds may be adjusted by turning the flange member 34 and sleeve 43 in the casing portion 44, thus adjusting the flange member 34 upward or downward. During such adjustment, all parts associated with the sleeve 43 and flange member 34 rotate therewith, and the thrust member 21 turns easily in its bearing 22ª in the cap 23.

In Fig. 3 I have shown a modified construction in which the cap 62 has a conical recess 63 to receive a ball 64 which is also seated in a semispherical recess 65 in the upper end of a thrust member 66, which corresponds to the thrust member 21 in Fig. 1.

In Fig. 4 I have shown a modified construction in which the flanged collars 32 and 33 and the ring 37 are replaced by a single-flange ring 70 slidable on the tube 38 previously described.

In Fig. 5 I have shown a further modification of the guide ring between the springs 30 and 31 in which antifriction rolls 75 are mounted in spaced relation in a ring 76 provided with spring-centering flanges 77 and 78.

Having thus described my invention and the advantages thereof, I do not wish to be limited to the details herein disclosed, otherwise than as set forth in the claims, but what I claim is:

1. Mechanism for moving a valve under control of a fluid-filled device which is responsive to temperature changes, said valve-moving mechanism comprising a frame, a casing, a bellows member fixed at its lower end to said casing and fixed at its upper end to a cap movable longitudinally of said casing on compression or expansion of said bellows member, said casing, bellows member and cap defining an enclosed space exterior to said bellows member and in communication with said fluid-filled device, a thrust member engaging and depressible by said cap, a tube depending from said thrust member and operatively connected to the valve to be moved, a guiding support adjustably secured in said frame and in which the lower end of said tube is freely slidable, a spring-centering guide member freely slidable on the middle portion of said tube, a coil spring loosely encircling said tube and interposed between said thrust member and said guide member, and a second coil spring also loosely encircling said tube and interposed between said guide member and said tube-guiding support, and said two springs being centered and held clear of said tube by portions of said thrust member, said guide member and said tube-guiding support which project within the end portions of said springs.

2. The combination in a valve-moving mechanism as set forth in claim 1, in which a swivel bearing is provided between the cap and the thrust bearing to facilitate alignment of the parts.

3. The combination in a valve-moving mechanism as set forth in claim 1, in which the two coil springs are of opposite hand whereby the tendency to transverse displacement is reduced.

CHARLES A. WEST.

REFERENCES CITED

The following references are of record in the file of this patent:

UNITED STATES PATENTS

| Number | Name | Date |
|---|---|---|
| 471,314 | McElroy | Mar. 22, 1892 |
| 1,137,272 | Moyle | Apr. 27, 1915 |
| 1,644,786 | Mallory | Oct. 11, 1927 |
| 1,885,711 | Giesler | Nov. 1, 1932 |
| 1,936,325 | Carson | Nov. 21, 1933 |